US011797795B1

(12) United States Patent
Wang et al.

(10) Patent No.: US 11,797,795 B1
(45) Date of Patent: Oct. 24, 2023

(54) INTELLIGENT SPEED REGULATION SYSTEM OF CONNECTOR PRODUCTION APPARATUS

(71) Applicant: SOOCHOW UNIVERSITY, Suzhou (CN)

(72) Inventors: Yihuai Wang, Suzhou (CN); Lei Zhou, Suzhou (CN); Wen Yu, Yihuai (CN); Yuhua Zhang, Suzhou (CN); Xin Liu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/025,905

(22) PCT Filed: Aug. 26, 2022

(86) PCT No.: PCT/CN2022/115107
§ 371 (c)(1),
(2) Date: Mar. 12, 2023

(30) Foreign Application Priority Data

Jun. 2, 2022 (CN) .......................... 202210626469.0

(51) Int. Cl.
*G06K 7/10* (2006.01)
(52) U.S. Cl.
CPC ................ *G06K 7/10722* (2013.01)
(58) Field of Classification Search
CPC ............................................. G06K 7/10722
See application file for complete search history.

(56) References Cited

U.S. PATENT DOCUMENTS

| 5,196,997 A * | 3/1993 | Kurtzberg | G05B 21/02 700/109 |
| 7,660,642 B1 | 2/2010 | Tuszynski | |
| 2005/0186327 A1* | 8/2005 | Saito | G01N 25/72 427/8 |
| 2015/0204800 A1* | 7/2015 | Mun | G01J 5/0896 348/126 |
| 2022/0088783 A1* | 3/2022 | Shao | B25J 9/0093 |

FOREIGN PATENT DOCUMENTS

| CN | 104913722 A | 9/2015 |
| CN | 106584800 A | 4/2017 |

(Continued)

*Primary Examiner* — Vincent H Tran
(74) *Attorney, Agent, or Firm* — SZDC LAW P.C.

(57) ABSTRACT

An intelligent speed regulation system of a connector production apparatus, including: a CCD detection system includes a CCD industrial camera and a CCD detection software module, wherein the CCD industrial camera is configured to shoot a connector plane picture; the CCD detection software module is configured to analyze and identify the connector plane picture, extract true position error value data and generate an error data table file; an intelligent speed regulation software unit configured to calculate an optimal operation speed value of the connector production apparatus according to the true position error value data of a connector; and a PLC apparatus configured to read the optimal operation speed value of the connector production apparatus, and control actions of mechanisms in the connector production apparatus to finish a speed regulation operation. The operation speed of the apparatus can be automatically adjusted according to quality of a connector product.

10 Claims, 7 Drawing Sheets

(56) References Cited

FOREIGN PATENT DOCUMENTS

| CN | 111545472 | A |   | 8/2020 |            |
|----|-----------|---|---|--------|------------|
| CN | 113887874 | A |   | 1/2022 |            |
| CN | 114136975 | A | * | 3/2022 |            |
| JP | 2009121865| A | * | 6/2009 | G01R 31/00 |

* cited by examiner

| | | |
|---|---|---|
| reference CPK | | change |
| CPK threshold | | change |
| CPK threshold | | change |
| data reading | | change |
| CPK error precision | | change |
| deletion time value | | change |
| apparatus speed increase value | | change |
| apparatus speed reduction value | | change | apparatus current value: 22100

CPK data deletion

INTELLIGENT SPEED REGULATION SYSTEM OF CONNECTOR PRODUCTION APPARATUS

This application is the National Stage Application of PCT/CN2022/115107, filed on Aug. 26, 2022, which claims priority to Chinese Patent Application No. 202210626469.0, filed on Jun. 2, 2022, which is incorporated by reference for all purposes as if fully set forth herein.

FIELD OF THE DISCLOSURE

The present application relates to the field of connector production technologies, and particularly to an intelligent speed regulation system of a connector production apparatus.

BACKGROUND OF THE DISCLOSURE

Connectors are basic devices of numerous industrial apparatuses, and quality thereof directly influences operation of the industrial apparatuses. In a production process of traditional connectors, an operation speed of the apparatus is often adjusted only dependent on personal experience to increase a yield. However, this mode consumes labor, wastes production materials and cannot accurately increase the yield.

SUMMARY OF THE DISCLOSURE

In view of this, an object of the present application is to provide an intelligent speed regulation system of a connector production apparatus, which can pertinently solve existing problems.

Generally, the present application has the following advantages and user experiences: the operation speed of the apparatus can be automatically adjusted according to quality of a connector product; finally, after a test, the intelligent speed regulation system can stably operate, an increase rate of a yield of the connector after speed regulation exceeds 4.5%, and a purpose of improving the yield of the connector is achieved.

DETAILED DESCRIPTION OF PREFERRED EMBODIMENTS

The present application will be described in further detail with reference to the drawings and embodiments.

In the present application, a structure and functions of an intelligent speed regulation system are explained first, contents, such as a speed regulation table, a process capability index (CPK) rating table, or the like, are then designed, and an intelligent speed regulation strategy solution suitable for a connector production apparatus is proposed based on the contents, thus achieving a function of calculating an optimal operation speed value of the apparatus according to a CPK of a connector. Finally, interfaces for CPK real-time monitoring, speed regulation simulating, historical data querying, or the like, of intelligent speed regulation software are designed. The following concepts are involved in the present application.

CCD detection software is configured to detect indexes, such as verticality, coplanarity, a pin width, a pin length, or the like, of various IC chips and electronic connectors. Firstly, a connector plane picture is shot in an environment with sufficient light using a CCD camera; then, threshold segmentation is realized using an image processing technology, changes of pixels of rows and columns are counted to realize projection positioning, and a position of a pin is determined according to a coordinate position; finally, true position error data of the pin is judged by calculating a distance using an Euclidean formula.

The true position error data refers to an angle value of a horizontal offset of the pin on a surface of the connector, a negative value represents a leftward offset, a positive value represents a rightward offset, and the larger the value is, the larger a pin offset error is, and quality of the connector is directly reflected. The data is calculated by the CCD detection software and stored in an industrial personal computer apparatus. In the true position error data of the connector, data in a first row is deviation data of pins in a first row, data in a second row is data of pins in a second row, data in a third row and a fourth row represents an upper specification limit (USL) and a lower specification limit (LSL) of the pins in the first row, and data in a fifth row and a sixth row represents a USL and an LSL of the pins in the second row. The data used in the present application below is the error data in the first row and the specification data in the third and fourth rows.

The CPK is a parameter indicating that decentralization objectively exists in a production process of a product, and is a method capable of indicating a quality level of the product. The larger a value of the CPK is, the better the product quality is, and the higher a process capability is. The CPK can be calculated using a CPK calculation formula, USL represents the upper specification limit, LSL represents the lower specification limit, $\bar{x}$ is an average value of the true position error data, and $\delta$ is a preset constant. By acquiring the data, the CPK of the connector can be calculated to evaluate the quality level of the connector, and the calculation formula is as follows.

$$CPK = \text{Min}\left[\frac{(USL - \bar{x})}{3\delta}, \frac{(\bar{x} - LSL)}{3\delta}\right] \quad \text{Formula (1)}$$

In the production process of the automatic apparatus, a bigger CPK of the product is not always better, and the CPK should be within a proper range, such that waste of resources of the production apparatus can be avoided. For this reason, it is necessary to establish rating standards and processing principles for the CPK, and conventional CPK rating and processing principles are described in table 1. When the CPK reaches 1.67, the quality of the finished product is excellent, a standard of a finished product rate is met, and after the value is exceeded, the apparatus can adapt to a production speed at this point, and the production speed of the apparatus can be increased to reduce the CPK of the product. When the industrial index CPK is less than 1.33, a number of defective products is large, and the operation speed of the apparatus is required to be decreased to increase the CPK of the product.

TABLE 1

CPK rating and processing principle

| Grade | CPK value | Processing principle |
|---|---|---|
|  | CPK ≥ 2.0 | A state is optimal and lowered to state A+ for operation |
| A+ | 1.67 < CPK < 2.0 | The CPK value is high, defects are not caused, the speed can be improved to level A, and a optimal rotating speed is realized |
| A | 1.33 < CPK < 1.67 | The state is good, and the present status is maintained |
| B | 1.0 ≤ CPK < 1.33 | The speed can be adjusted to level A |
| C | 0.67 ≤ CPK < 1.0 | Manufactured defective products are numerous, and the speed is high and lowered to level B |
| D | CPK < 0.67 | An engineering capability is poor, a warning is given to remind a worker, and the speed is immediately decreased to level A |

1 Structure and Function of Intelligent Speed Regulation System

Figure 1:
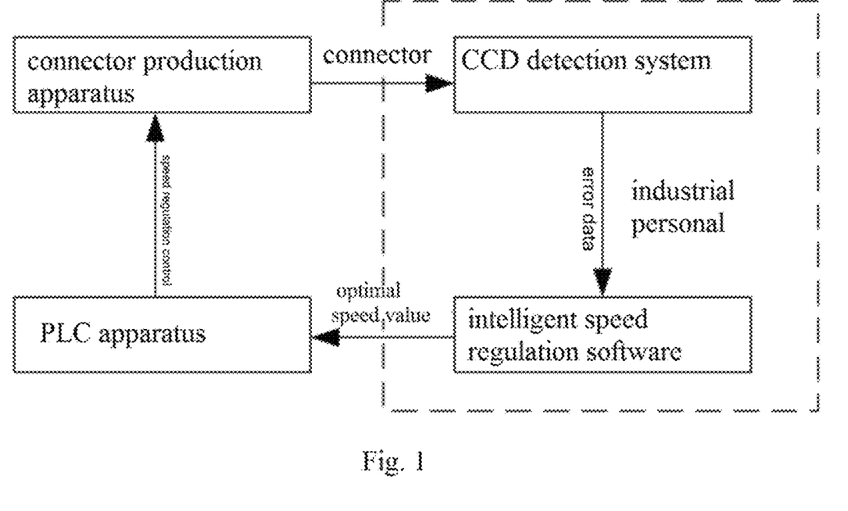
FIG. 1 shows a schematic principle diagram of an architecture of an intelligent speed regulation system of a connector production apparatus according to the present application.

The intelligent speed regulation system has a structure shown in FIG. 1, has the function of automatically regulating the speed of the connector production apparatus to increase a yield value, and includes the connector production apparatus, the CCD detection software, the intelligent speed regulation software and a PLC apparatus. Firstly, the connector production apparatus is responsible for producing the connector, and then, the CCD detection software analyzes and identifies the connector plane picture shot by a CCD industrial camera, so as to extract the true position error value data to generate an error data table file. Then, the optimal operation speed value of the connector production apparatus is calculated according to the true position error data of the connector. Finally, a speed value in a file of the industrial personal computer apparatus is read by the PLC apparatus, and actions of mechanisms in the connector production apparatus are controlled to complete a speed regulation operation. The intelligent speed regulation software is a core of the intelligent speed regulation system, and a design process of the intelligent speed regulation software is mainly explained in the present application.

2 Intelligent Speed Regulation Software Program Design

Figure 2:
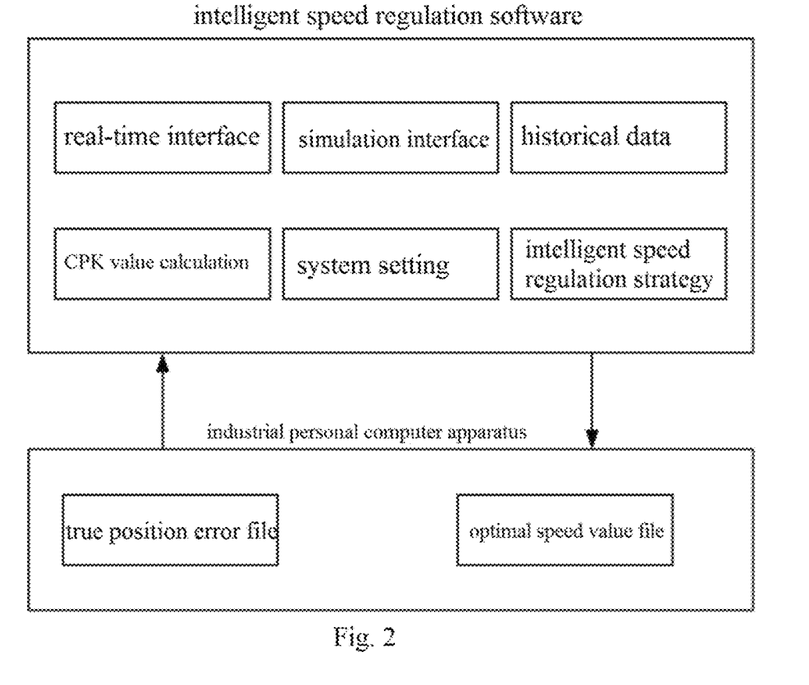
FIG. 2 shows an architecture diagram of an intelligent speed regulation software module in an embodiment of the present application.

The intelligent speed regulation software is based on calculation of the CPK and has a core of a design of a speed regulation strategy module. In the section, a calculation mode of the CPK and a design scheme of an intelligent speed regulation strategy are mainly explained, and functions of CPK real-time monitoring, speed regulation simulating, historical data querying, or the like, are achieved. A software functional framework of the intelligent speed regulation system is shown in FIG. 2.

2.1 CPK Calculation Module Design

Figure 3:
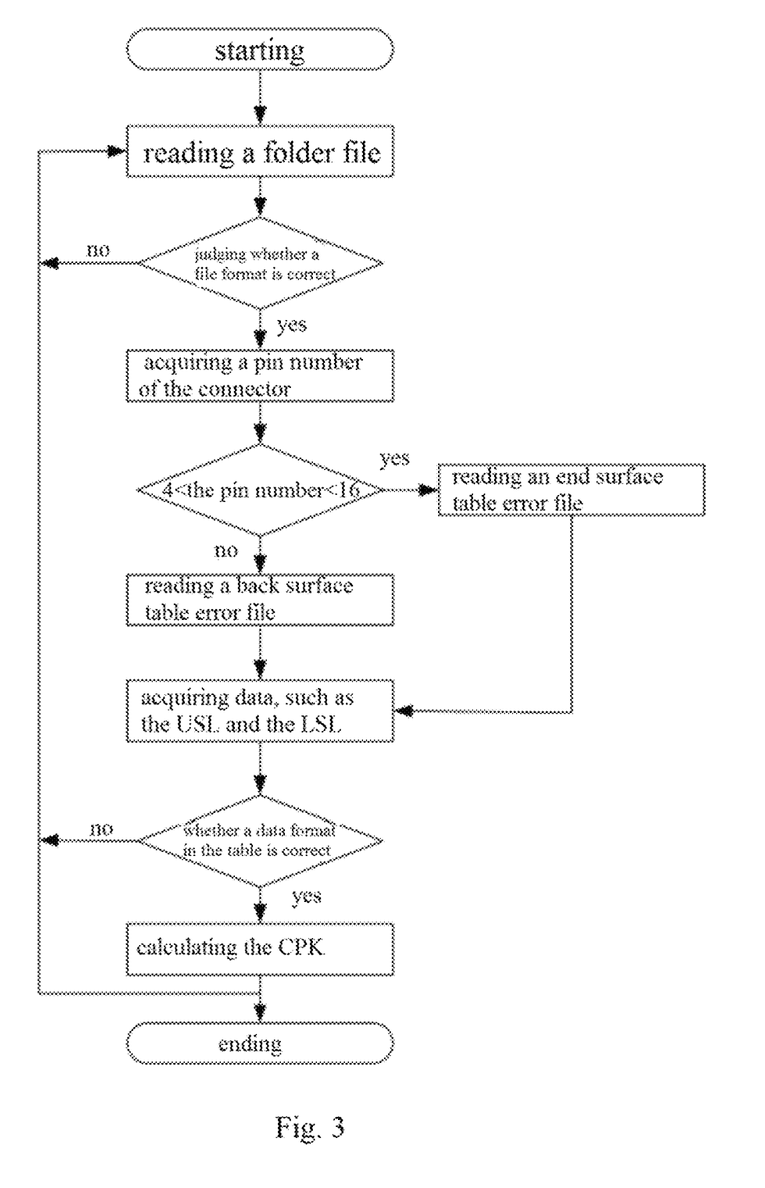
FIG. 3 shows a schematic flow chart of a CPK calculation program.

Since the quality level of the product cannot be evaluated only by the true position error data provided by the CCD detection software, the calculation of the CPK is the basis of the intelligent speed regulation system. Therefore, in the present application, the CPK is calculated using the CPK calculation formula with the true position error data of the connector as input, so as to represent the quality level of the connector. An execution flow of a CPK calculation module is shown in FIG. 3.

(1) Folder file reading. When a program starts to be executed, a path of a folder where the true position error data is located and all error folders in the folder are read, and meanwhile, whether two table files of "end surface" and "back surface" exist in one error folder is judged, and if one of the table files is lacked, the error folder is removed, and a next error folder is read.

(2) Acquisition of text content in file. When data in the error folder is correct, a pin number in the table file is started to be read, and when the pin number is greater than 4 and less than 16, the data, such as the error data, the LSL, the USL, or the like, in an "end surface" table is read, and otherwise, the data in a "back surface" table is read, and meanwhile, whether the error data in the table has a problem of an incorrect pin number or data format is judged.

(3) Calculation of CPK. After the error data, the LSL and the USL in the table are obtained, the CPK of the connector is calculated according to the calculation formula.

2.2 Intelligent Speed Regulation Strategy Design

The intelligent speed regulation strategy is a core of the intelligent speed regulation software and includes the speed regulation table and the CPK rating table. In this section, a speed regulation table and a CPK rating table suitable for the system are designed by referring to the contents of the CPK rating table, the processing principle, or the like, in table 1.

1. Design of Speed Regulation Table

The design of the speed regulation table is most important in the design of the speed regulation strategy module, whether the connector production apparatus can stably operate is determined by quality of the speed regulation table, and when the speed of the connector production apparatus can be regulated according to the strategy of a speed regulation table A within a specified time until the CPK tends to be stable within a defined range, the speed can be regulated according to the strategy of a speed regulation table B. After a speed regulation table C collects enough reference data, the whole system starts to regulate the speed by directly using the strategy of the speed regulation table C subsequently, and detailed speed regulation strategy descriptions of the three speed regulation tables designed in the present application are shown in table 2.

TABLE 2

| Speed regulation table name | Description | Remark |
|---|---|---|
| Speed regulation table A | Phased speed increase values are 200, 400, 600 and 800, and a speed reduction value is 500 | The connector production apparatus has a starting production operation speed value of 22,000, and can operate at a highest speed value of 28,000, but a collision phenomenon may occur. |
| Speed regulation table B | The phased speed increase value is 100, and the speed reduction value is not provided | |
| Speed regulation table C | The table records data, such as an initial CPK, a CPK difference, the apparatus speed increase value, or the like | |

In field measurement, the quality of the connector is reduced when the apparatus is accelerated too fast, a production efficiency is reduced or the collision phenomenon is caused when the apparatus is accelerated too slow, and therefore, finally, after a test scheme and result shown in table 3, the optimal speed increase value of the speed regulation table A is selected to 200 and the speed reduction value thereof is selected to 500, which conforms to an optimal speed regulation production state of the connector production apparatus.

TABLE 3

Speed regulation test scheme and result

| Serial number | Speed increase value | Speed reduction value | Test result |
|---|---|---|---|
| 1 | 100 | 100 | A speed increase effect is stable, but a speed reduction effect is slow, and the yield is not obviously increased |
| 2 | 200 | 200 | The speed increase effect is stable, and the speed reduction effect is not obvious |
| 3 | 200 | 400 | Speed increasing is stable, and the speed reduction effect is obvious |
| 4 | 200 | 500 | Speed increasing is stable, the speed reduction effect is obvious, and the apparatus is stable |
| 5 | 200 | 600 | The apparatus is stable when the speed is increased and reduced |
| 6 | 300 | 500 | The apparatus is unstable when the speed is increased, and stable when the speed is reduced, and the CPK is reduced and unstable |
| 7 | 400 | 500 | When the speed is increased, the apparatus is unstable and the collision phenomenon is generated |
| 8 | 500 | 500 | When the speed is increased, the apparatus is unstable and the collision phenomenon is generated plural times |

2. Design of CPK Rating Table

In the production process of the automatic apparatus, the quality level of the product conforms to a normal distribution trend, the CPK does not have a too large trend change, only three most basic ranges are required to be selected for the thus selected CPK rating table, a lowest CPK threshold can be defined to 1.33, a highest CPK threshold can be defined to 1.67, the CPK rating table is formulated on this basis, an error range of 0.1 is reserved as a margin for apparatus speed regulation, and a specific description is shown in table 4.

TABLE 4

| | Description of rating table | |
|---|---|---|
| State description | CPK range | Description |
| Excellent | CPK >1.68 | The speed is regulated with reference to the speed regulation table A and the speed regulation table C |
| Good | 1.33 < CPK < 1.67 | The speed is regulated with reference to the speed regulation table B |
| Poor | CPK <1.32 | The speed is regulated with reference to the speed regulation table A |

3. Design of Speed Regulation Strategy Program

Figure 4:
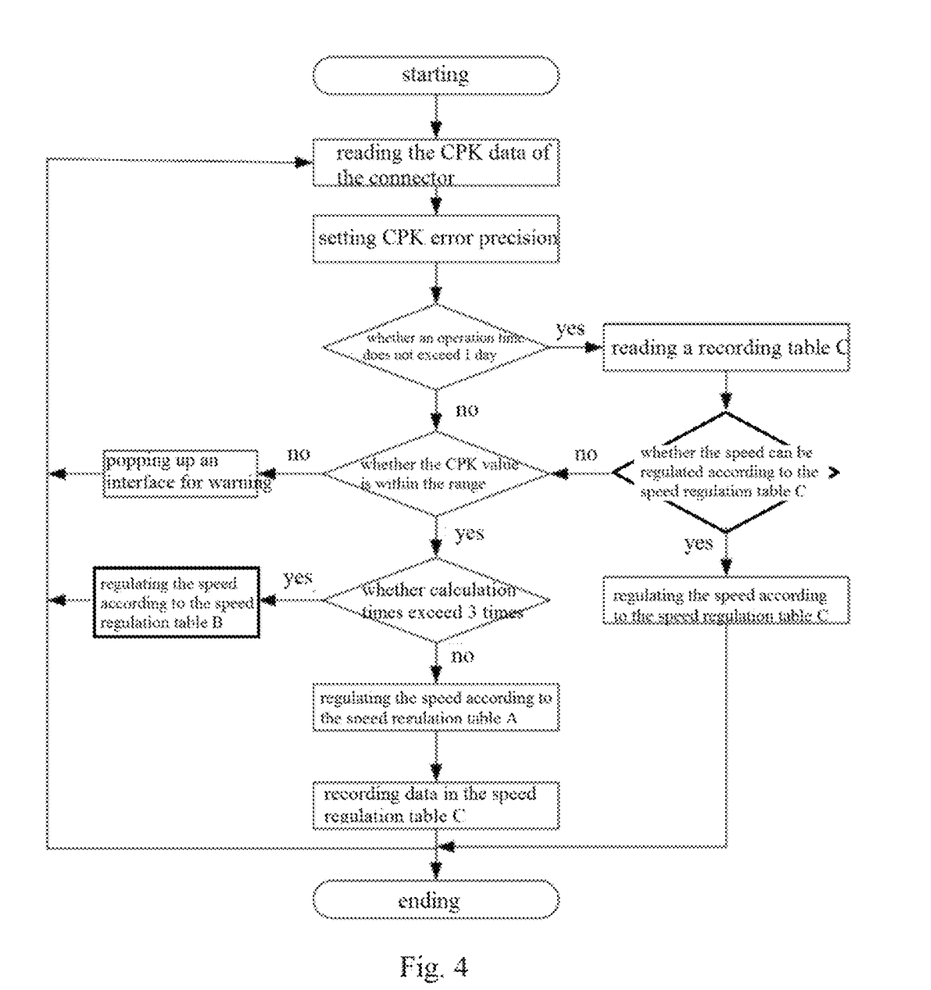
FIG. 4 shows a flow chart of a speed regulation strategy in the present application.

On the basis of completion of the design of the speed regulation table and the CPK rating table, a speed regulation strategy program is designed with the CPK of the connector as input, so as to enable the connector production apparatus to operate according to the speed value in the speed regulation table, and an execution flow is shown in FIG. 4.

(1) Judgment of CPK range. When the CPK is within a set range, the quality of the connector is good, the speed can be regulated without referring to the speed regulation table, and the apparatus still operates at the previous apparatus speed; when the CPK is greater than 1.67, the speed is increased at an interval of a speed value of 200 according to the strategy of the speed regulation table A, and if the CPK value is still higher than 1.67 after the speed increase, the speed is regulated according to a speed value of 400, and the highest speed increase value can reach 800; when the CPK is less than 1.32, the speed is reduced at a speed value of 500 according to the speed regulation table A until the CPK is higher than 1.32, such that the quality of the subsequently produced connector is guaranteed.

(2) Judgment of speed regulation table. When an operation time of the speed regulation strategy program exceeds 24 hours, in order to accelerate a speed of the calculation of the speed regulation value, in subsequent speed regulation, the speed regulation value of the apparatus can be directly calculated by contrasting values, such as the initial CPK, the CPK difference, the apparatus speed increase value, or the like, in the strategy of the speed regulation table C; when the program time does not reach the specified time, whether the CPK is within the set specified range is judged, and if yes, the speed is regulated according to the strategy of the speed regulation table B when speed regulation times are also judged to reach 3 times. Otherwise, the speed is regulated by referring to the strategy of the speed regulation table A.

2.3 System Interface and Functional Design

In order to enable a user to visually monitor variation trends of the CPK value and the apparatus speed, in the system, the interfaces for CPK real-time monitoring, speed regulation simulating, system parameter setting, historical data querying, or the like, are designed on the basis of realizing intelligent speed regulation, and meanwhile, an interface translation function is added according to requirements.

1. CPK Real-Time Monitoring Interface

Figure 5:
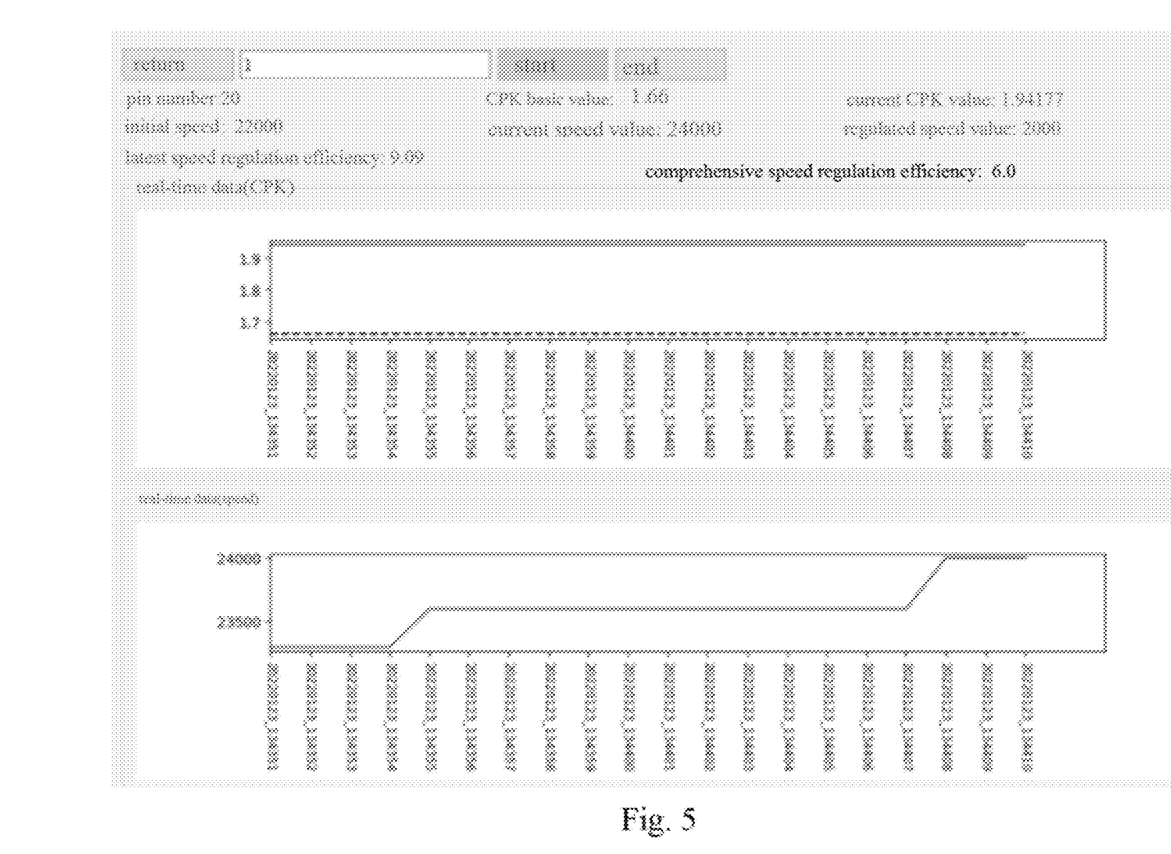
FIG. 5 shows a schematic diagram of a CPK and speed real-time monitoring interface in the present application.

The CPK real-time monitoring interface shows a display state of the intelligent speed regulation software and mainly includes three parts: an apparatus information state column, a CPK real-time data column and a speed real-time data column. The apparatus information state column is used for displaying a pin value, a current apparatus speed value, the CPK value, a comprehensive improvement efficiency and other data for the user to view in real time. As shown in FIG. 5, the CPK real-time data column and the speed real-time column are updated at an interval of 13 s, and variation trends thereof are displayed by means of line graphs, such that the user can conveniently perform observation in time.

2. Speed Regulation Simulating Interface

Figure 6:
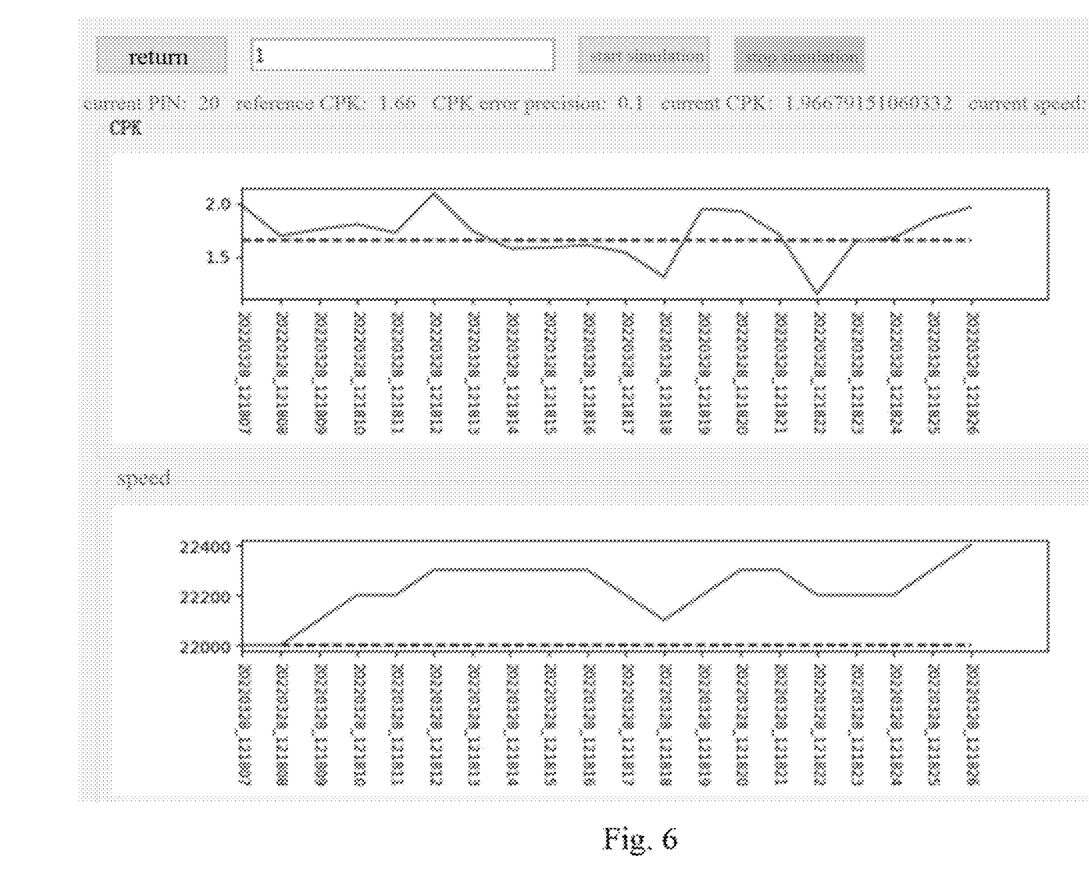
FIG. 6 shows a schematic diagram of a speed regulation simulation interface in the present application.

The interface can facilitate a speed regulation test of the connector production apparatus to judge whether the error data is correct. The speed regulation simulating interface is mainly divided into three parts: a simulation test, a pin test and CPK test calculation, and a test result of the speed regulation simulating interface is shown in FIG. 6.

(1) Simulation test. A speed value simulation change trend of the current apparatus can be tested only by inputting the pin number of the connector produced by the connector production apparatus, a real CPK value, the current apparatus speed, a self-set basic value CPK and a CPK error precision value on the speed regulation simulating interface. For different connector production apparatuses in a factory, parameter values of the speed regulation tables can be quickly found, thus saving a test time.

(2) Pin test. The connector production apparatus can produce different batches of connectors which have different pin numbers, and in order to test the quality levels of the current connectors produced by different apparatuses, the CPK value of the current error file can be calculated only by inputting, on the interface, the pin number and the path of the file where the error data is located.

(3) CPK test. The path of the file where the error data is located is selected for calculating the CPK value.

3. System Parameter Setting Interface

Figure 7:
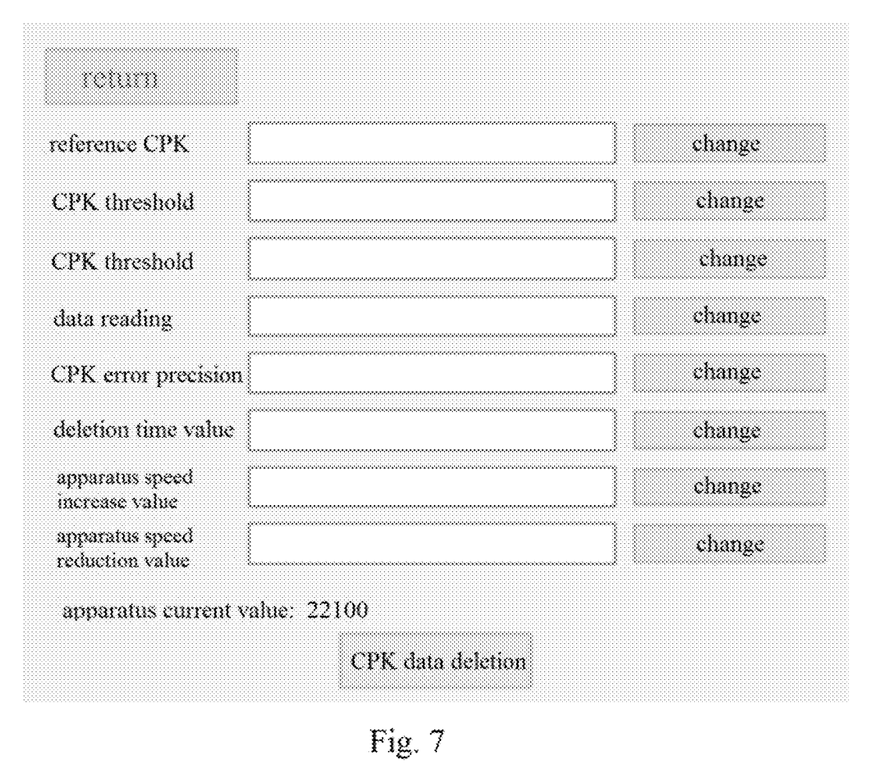
FIG. 7 shows a schematic diagram of a system parameter self-setting interface in the present application.

The system parameter setting interface is shown in FIG. 7, and used to set parameters, such as a basic CPK value, a CPK threshold, a speed regulation interval, CPK error precision, a data deletion time interval, the apparatus speed increase value, the speed reduction value, or the like, and the parameters can be directly modified according to different conditions of the connector production apparatuses. Meanwhile, in order to prevent a speed of reading the table by the software from being influenced by excessive true position error files, a button capable of deleting the error files within 2 hours is set below the interface.

4. Historical Data Querying Interface

A historical data page includes a CPK historical data column and a speed regulation table column, the user selects a query time range, and then clicks a query button, a comprehensive CPK value and a current speed value can be queried in the CPK historical data column, and data, such as a speed value before speed regulation, a speed value after speed regulation, a speed regulation mode, a comprehensive yield increase rate, or the like, can be queried in the speed regulation table column.

5. Interface Translation Function

Figure 8:
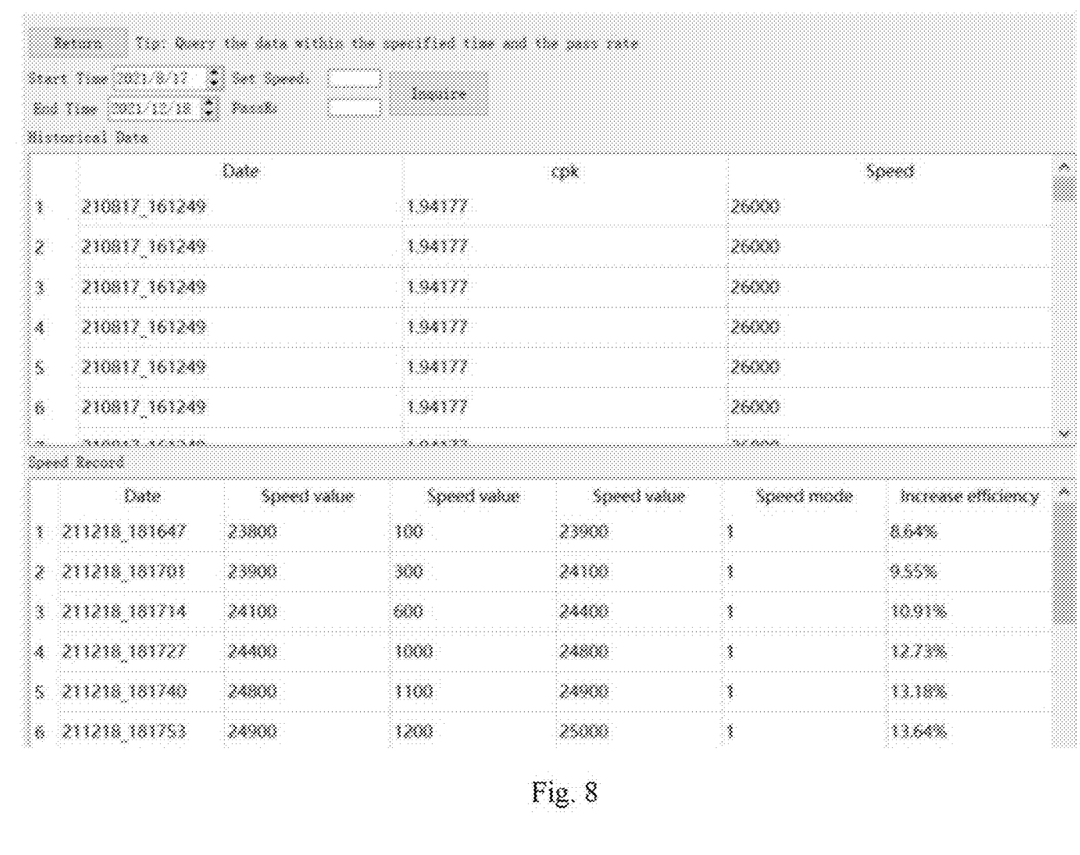
FIG. 8 shows a schematic diagram of a historical-data English interface in the present application.

The software interface of the intelligent speed regulation system is a Chinese interface, and in order to meet user requirements, the translation function is added on the setting interface in the present application, and the Chinese speed regulation software interface can be translated into an English software interface only by clicking a translation button. The translated English interface is shown in FIG. 8.

3 Test of Intelligent Speed Regulation Software

A test of the intelligent speed regulation software mainly includes a stability test and an effectiveness test, the stability test is used for testing duration in which the system can stably operate, and the effectiveness test is used for testing whether the system can play a role in increasing the yield of the connector.

3.1 Stability Test

After the system design is finished, the stability test is performed to observe whether phenomena of a system crash, a system breakdown, or the like, occur. When the system can be determined to stably operate, the system is deployed to the industrial personal computer of the connector production apparatus, the speed regulation operation is started in conjunction with the PLC apparatus, and meanwhile, whether the connector production apparatus has a collision phenomenon is observed. Table 5 shows actual test details, and the test result shows that the system can stably operate without generating the collision phenomenon.

TABLE 5

Actual test detail of system

| Test content | Test result |
| --- | --- |
| Stable operation time of system | ≥10 days |
| The connector production apparatus generates the collision phenomenon | The apparatus operates stably and does not generate the collision phenomenon |

3.2 Effectiveness Test

Effectiveness of the system indicates whether the yield of the connectors is obviously increased on the premise that the intelligent speed regulation system stably regulates the speed. A yield increase rate is equivalent to a speed value increase rate, and a yield increase value after the speed regulation of the connector production apparatus can be simulated by looking up the speed increase rate of the historical data. The system sets the initial operation speed value to 22,000, the yield increase value is calculated every two hours, table 6 shows relevant data of the speed regulation of the field connector production apparatus, and it can be found by contents in the table that the yield increase rate of the connector production apparatus is higher than 4.5%, and the test result meets the requirement of the system.

TABLE 6

Relevant content of speed regulation of connector production apparatus

| Date | Speed before speed regulation | Speed after speed regulation | Speed regulation mode | Speed value increase rate |
| --- | --- | --- | --- | --- |
| 21-12-18 18:16:47 | 22,800 | 23,000 | A | 4.54% |
| 21-12-18 20:16:55 | 23,000 | 23,400 | A | 6.36% |
| 21-12-18 10:17:30 PM | 23,400 | 24,000 | A | 9.01% |
| 21-12-19 00:17:59 | 24,000 | 23,500 | A | 6.81% |

5.4 Conclusion of Present Application

In the present application, the structure and the function of the software of the intelligent speed regulation system are introduced first, and the contents, such as the CCD detection software, the CPK, the CPK rating table, or the like, are described; then, the speed regulation strategy module is designed according to the contents, and after continuous field measurement, the speed increase parameter value and the speed reduction parameter value are selected to 200 and 500, and the upper and lower limit threshold parameters of the CPK are selected to 1.33 and 1.66; then, the construction work of the intelligent speed regulation software is completed based on relevant parameter values, and the function of automatically regulating the operation speed of the apparatus according to the quality of the connector product is achieved; finally, after the test, the intelligent speed regulation system can stably operate, the increase rate of the yield of the connector after speed regulation exceeds 4.5%, and the purpose of improving the yield of the connector is achieved.

It should be noted:

The algorithms and displays presented herein are not inherently related to any particular computer, virtual system, or other device. Various generic systems can also be used with the teachings based on this. The structure required to construct such a system is apparent from the above description. Furthermore, this application does not target any specific programming language.

It should be understood that various programming languages can be used to implement the content of the application described here, and the above description of specific languages is for disclosing the best implementation mode of the application.

In the description provided herein, numerous specific details are set forth. However, it is understood that the embodiments of the application may be practiced without these specific details. In some instances, well-known methods, structures and techniques have not been shown in detail in order not to obscure the understanding of this description.

Similarly, it should be understood that in the above description of exemplary embodiments of the application, in order to streamline the application and to facilitate understanding of one or more of the various inventive aspects, various features of the application are sometimes grouped together in a single embodiment, figure, or its description. However, the disclosed methods should not be construed as It is intended to reflect an intention that the claimed application requires more features than are expressly recited in each claim. Rather, as the following claims reflect, inventive aspects lie in less than all features of a single foregoing disclosed embodiment. Thus, the claims following the detailed description are hereby expressly incorporated into the detailed description, with each claim standing on its own as a separate embodiment of this application.

Those skilled in the art can understand that the modules in the device in the embodiment can be adaptively changed and arranged in one or more devices different from the embodiment. Modules or units or components in the embodiments may be combined into one module or unit or component, and furthermore may be divided into a plurality of sub-modules or sub-units or sub-assemblies. All features disclosed in this specification (including accompanying claims, abstract and drawings) and any method or method so disclosed may be used in any combination, except that at least some of such features and/or processes or units are mutually exclusive. All processes or units of equipment are combined. Each feature disclosed in this specification (including accompanying claims, abstract and drawings), may be replaced by alternative features serving the same, equivalent or similar purpose, unless expressly stated otherwise.

In addition, those skilled in the art will understand that although some embodiments described herein include some features included in other embodiments but not others, combinations of features from different embodiments are meant to be within the scope of the present application and form different embodiments. For example, in the following claims, any of the claimed embodiments may be used in any combination.

The various component embodiments of the present application may be realized in hardware, or in software modules running on one or more processors, or in combination thereof. Those skilled in the art should understand that a microprocessor or a digital signal processor (DSP) may be used in practice to implement some or all functions of some or all components in the virtual machine creation system according to the embodiment of the present application. The present application can also be implemented as an apparatus or system program (e.g., computer program and computer program product) for performing a part or all of the methods described herein. Such a program implementing the present application may be stored on a computer-readable medium, or may be in the form of one or more signals. Such a signal may be downloaded from an Internet site, or provided on a carrier signal, or provided in any other form.

It should be noted that the above-mentioned embodiments illustrate rather than limit the application, and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "A" or "an" do not exclude the presence of a plurality of such elements. The application can be implemented by means of hardware comprising several different elements and by means of a suitably programmed computer. In the unit claims enumerating several systems, these systems Several of these may be embodied by the same item of hardware. The use of the words first, second, third, etc. does not indicate any order. These words may be interpreted as names.

The above is only a specific embodiment of the application, but the scope of protection of the application is not limited thereto. Any person familiar with the technical field can easily think of its various changes or modifications within the technical scope disclosed in the application. Replacement, these should be covered within the protection scope of this application. Therefore, the protection scope of the present application should be determined by the protection scope of the claims.

What is claimed is:

1. An intelligent speed regulation system of a connector production apparatus, comprising:
    a CCD detection system comprising a CCD industrial camera and a CCD detection software module, wherein the CCD industrial camera is configured to shoot a connector plane picture; the CCD detection software module is configured to analyze and identify the connector plane picture, extract true position error value data and generate an error data table file;
    an intelligent speed regulation software unit configured to calculate an optimal operation speed value of the connector production apparatus according to the true position error value data of a connector; and
    a PLC apparatus configured to read the optimal operation speed value of the connector production apparatus, and control actions of mechanisms in the connector production apparatus to finish a speed regulation operation.

2. The system according to claim 1,
    wherein the intelligent speed regulation software unit comprises a CPK calculation module and an intelligent speed regulation strategy module.

3. The system according to claim 2,
    wherein the CPK calculation module is configured to execute the following operations:
    (1) reading a folder file; reading a path of a folder where the true position error data is located and all error folders in the folder, and meanwhile judging whether an end surface table file and a back surface table file exist in one error folder, and if one of the table files is lacked, removing the error folder, and reading a next error folder;
    (2) acquiring text contents in the file; when data in the error folder is correct, starting to read a pin number in the table file, and when the pin number is greater than 4 and less than 16, reading the data, such as the error data, an LSL and a USL, in an end surface table, and otherwise, reading the data in a back surface table, and meanwhile, judging whether the error data in the table has an incorrect pin number or data format; and
    (3) calculating a CPK; after the error data, the LSL and the USL in the table are obtained, calculating the CPK of the connector according to a calculation formula.

4. The system according to claim 3,
    wherein the calculation formula of the CPK is:

$$CPK = \operatorname{Min}\left[\frac{(USL - \bar{x})}{3\delta}, \frac{(\bar{x} - LSL)}{3\delta}\right] \quad \text{Formula (1)}$$

wherein USL represents an upper specification limit, LSL represents a lower specification limit, $\bar{x}$ is an average value of the true position error data, and $\delta$ is a preset constant.

5. The system according to claim 2,
    wherein the intelligent speed regulation strategy module comprises a speed regulation table and a CPK rating table.

6. The system according to claim 5,
    wherein the intelligent speed regulation strategy module takes the CPK of the connector as input, such that the connector production apparatus operates according to a speed value in the speed regulation table.

7. The system according to claim 6,
wherein the intelligent speed regulation strategy module is configured to execute the following operations:
(1) judging a CPK range; when the CPK is within a set range, still allowing the apparatus to operate at an original apparatus speed; when the CPK is greater than 1.67, increasing the speed at an interval of a speed value of 200, and if the CPK value is still higher than 1.67 after the speed increase, regulating the speed according to a speed value of 400; when the CPK is less than 1.32, reducing the speed at a speed value of 500 until the CPK is higher than 1.32; and
(2) judging a speed regulation table; when an operation time of a speed regulation strategy program exceeds 24 hours, calculating a speed regulation value of the apparatus according to an initial CPK, a CPK difference and an apparatus speed increase value in the speed regulation table; when the program time does not reach the specified time, judging whether the CPK is within the set specified range, and if yes, regulating the speed according to a strategy of the speed regulation table when speed regulation times are also judged to reach 3 times.

8. The system according to claim 1,
wherein the system has interfaces for CPK real-time monitoring, speed regulation simulating, system parameter setting and historical data querying, and meanwhile has an interface translation function.

9. The system according to claim 8,
wherein the speed regulation simulating interface comprises a simulation test, a pin test and CPK test calculation.

10. The system according to claim 1,
wherein in the true position error data of the connector, data in a first row is deviation data of pins in a first row, data in a second row is data of pins in a second row, data in a third row and a fourth row represents the USL and the LSL of the pins in the first row, and data in a fifth row and a sixth row represents the USL and the LSL of the pins in the second row.

* * * * *